(12) United States Patent
Jagmag et al.

(10) Patent No.: US 8,146,121 B2
(45) Date of Patent: Mar. 27, 2012

(54) SYSTEMS AND METHODS FOR PROCESSING PROGRAM CONTENT AND INFORMATION IN A VIDEO BROADCAST

(75) Inventors: Adil Jagmag, Hollis, NH (US); Rajesh Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 355 days.

(21) Appl. No.: 12/491,830

(22) Filed: Jun. 25, 2009

(65) Prior Publication Data

US 2010/0251307 A1    Sep. 30, 2010

Related U.S. Application Data

(60) Provisional application No. 61/165,284, filed on Mar. 31, 2009.

(51) Int. Cl.
*H04N 7/173* (2011.01)
(52) U.S. Cl. .............................. 725/50; 725/39; 725/116
(58) Field of Classification Search .................. None
See application file for complete search history.

(56) References Cited

U.S. PATENT DOCUMENTS

| | | | |
|---|---|---|---|
| 5,666,923 A * | 9/1997 | Collier et al. | 123/488 |
| 6,115,074 A | 9/2000 | Ozkan et al. | |
| 2002/0035726 A1 * | 3/2002 | Corl | 725/39 |
| 2007/0256098 A1 * | 11/2007 | Yum | 725/38 |

* cited by examiner

*Primary Examiner* — Brian Pendleton
*Assistant Examiner* — Cai Chen
(74) *Attorney, Agent, or Firm* — Sterne, Kessler, Goldstein & Fox P.L.L.C.

(57) ABSTRACT

Embodiments of the present invention significantly decrease the processing requirements as well as the cost of digital television receivers. In an embodiment, processing requirements of both hardware and software components in digital television receivers are lowered by generating the channel map without regard to channel map information present in a Virtual Channel Table (VCT). In another embodiment, significant recurring portions of an ATSC signal can be neglected with no processing power, cost, and time spent thereon. In another embodiment, processing typically used to process channel map information contained in the VCT portion of the ATSC signal is freed and may instead be used to process other information, thereby enabling further enhancements and features in digital television services.

23 Claims, 4 Drawing Sheets

SYSTEMS AND METHODS FOR PROCESSING PROGRAM CONTENT AND INFORMATION IN A VIDEO BROADCAST

CROSS-REFERENCE TO RELATED APPLICATIONS

The present application claims the benefit of U.S. Provisional Patent Application No. 61/165,284, filed Mar. 31, 2009, which is incorporated herein by reference in its entirety.

BACKGROUND OF THE INVENTION

1. Field of the Invention

The present invention relates generally to processing program content and information in a video broadcast.

2. Background Art

The ATSC (Advanced Television Systems Committee) digital television standard provides for the use of a packetized stream to transmit program content and information corresponding to multiple broadcast channels. In addition, the ATSC standard provides that a physical RF channel in an ATSC signal is divided into a number of virtual sub-channels, each corresponding to a particular broadcast channel.

In order to map transmitted content to broadcast channels in an ATSC signal, an ATSC packetized stream includes information that allows a digital television receiver to generate a channel map. Typically, channel map information is transmitted in two different portions of the ATSC packetized stream: the Program Map Table (PMT) and the Virtual Channel Table (VCT).

Conventional digital receiver designs expend processing power and cost to process duplicate channel map information contained in an ATSC signal.

BRIEF SUMMARY OF THE INVENTION

The present invention relates generally to processing program content and information in a video broadcast.

Embodiments of the present invention significantly decrease the processing requirements as well as the cost of digital television receivers. In an embodiment, processing requirements of both hardware and software components in digital television receivers are lowered by generating the channel map without regard to channel map information present in the Virtual Channel Table (VCT). In another embodiment, significant recurring portions of the ATSC signal can be neglected with no processing power, cost, and time spent thereon. In another embodiment, processing power typically used to process channel map information contained in the VCT portion of the ATSC signal is freed and may instead be used to process other information, thereby enabling further enhancements and features in digital television services.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
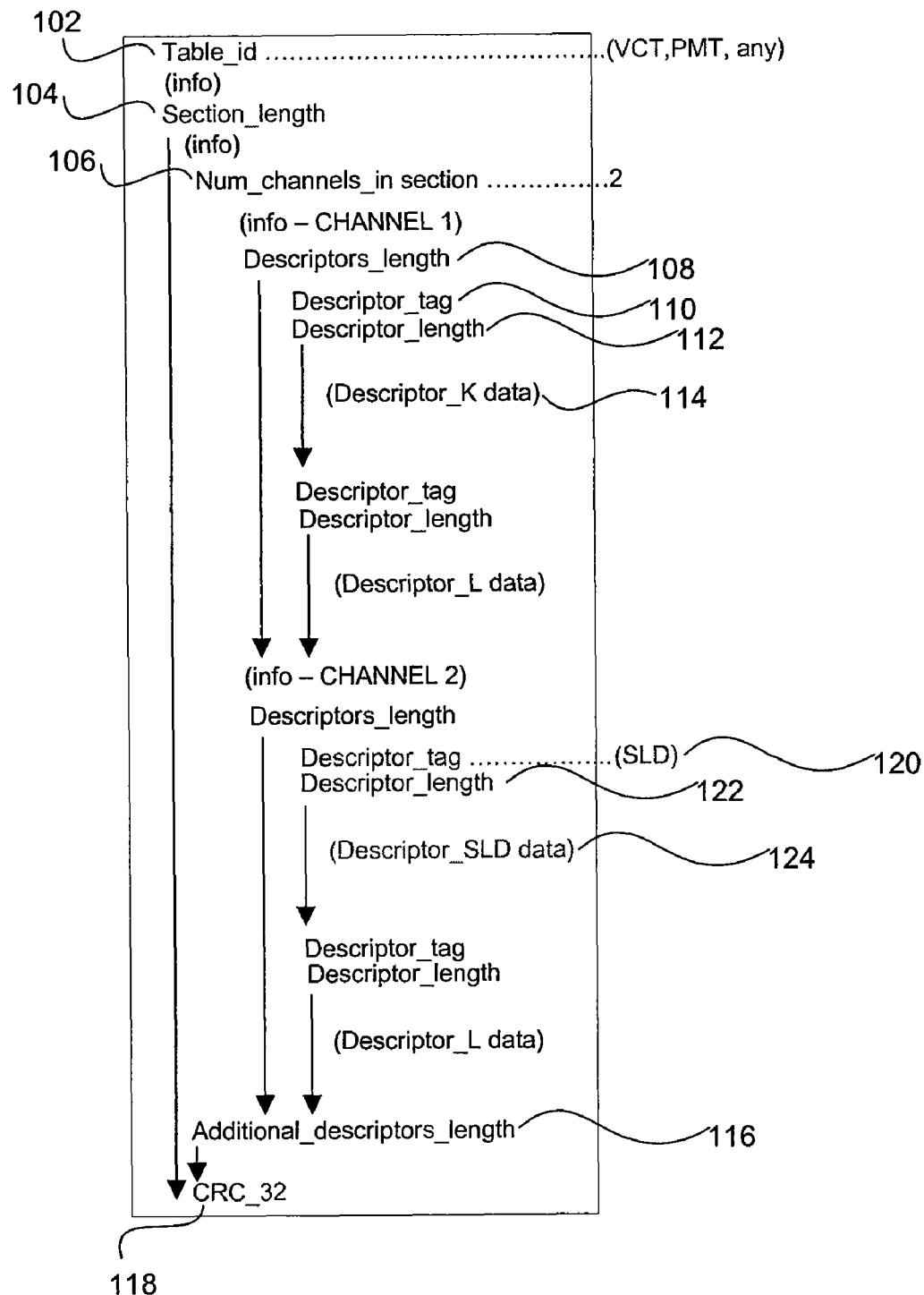

FIG. 1 illustrates an example of a typical bit stream syntax used to transmit an ATSC table section.

Figure 2:
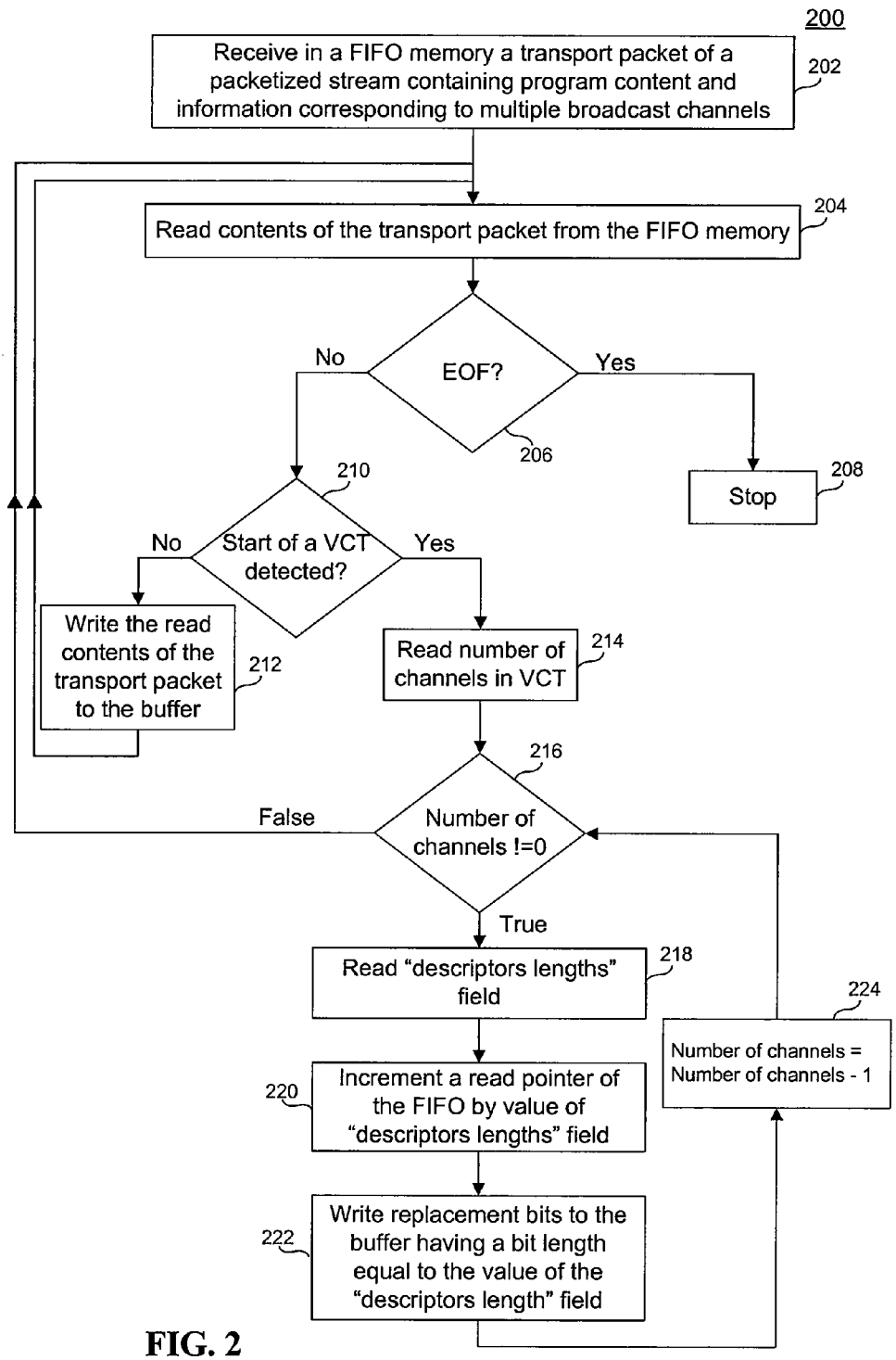
Figure 3:
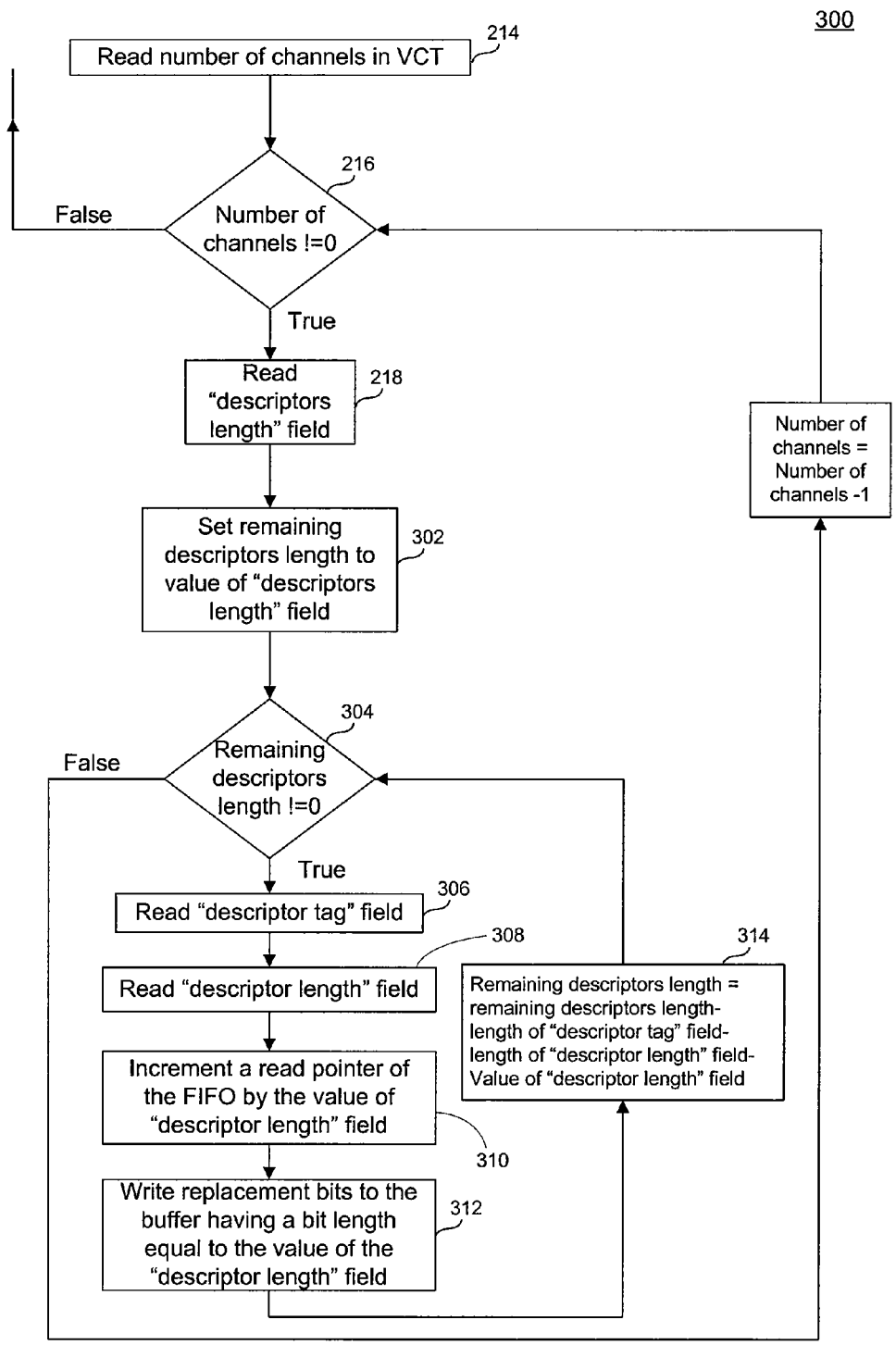
Figure 4:
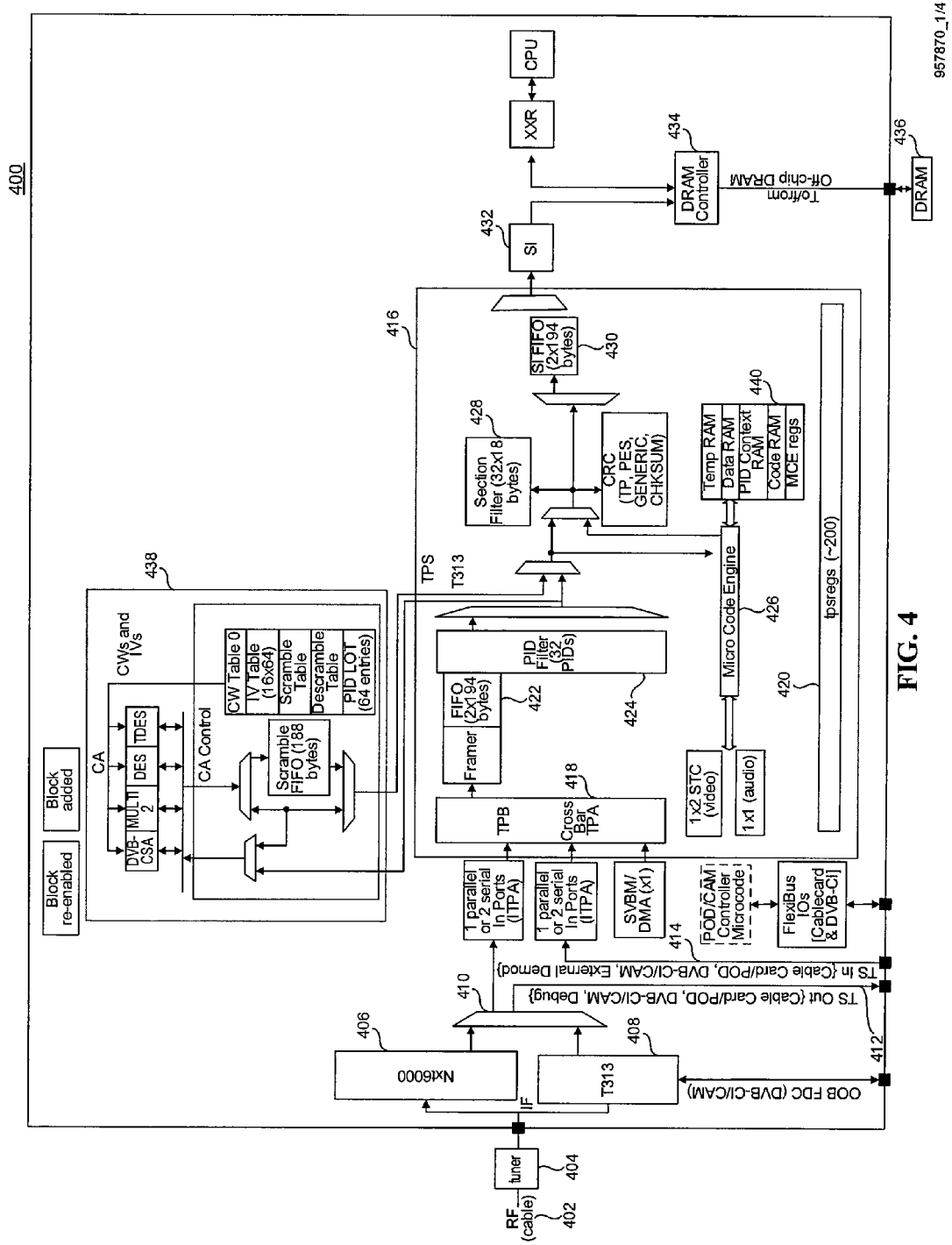

FIG. 2 is a process flowchart of a method of processing a packetized stream containing program content and information according to an embodiment of the present invention FIG. 3 is a process flowchart of another method of processing a packetized stream containing program content and information according to an embodiment of the present invention FIG. 4 illustrates an example implementation of a digital television receiver chip capable of performing embodiments of the present invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

The ATSC (Advanced Television Systems Committee) digital television standard provides for the use of a packetized stream to transmit program content and information corresponding to multiple broadcast channels. Typically, the packetized stream is encoded according to the MPEG-2 ("Moving Pictures Expert Group-2") standard. In addition, the ATSC standard provides that a physical RF channel in an ATSC signal is divided into a number of virtual sub-channels, each corresponding to a particular broadcast channel.

In order to map transmitted content to broadcast channels in an ATSC signal, an ATSC packetized stream includes information that allows a digital television receiver to generate a channel map. The channel map includes, for example, information that allows the digital television receiver to locate a broadcast channel in the ATSC signal spectrum. Further, the channel map includes information that associates a broadcast channel with packet identifiers (PIDs), which can be used subsequently to identify packets in the ATSC packetized stream corresponding to programming on the broadcast channel.

Typically, channel map information is transmitted in different portions of the ATSC packetized stream, including the Program Map Table (PMT), the Program Association Table (PAT), and the Virtual Channel Table (VCT). The VCT includes information that replicates information in the PMT and is broadcast more frequently than the PMT. For this reason, certain conventional digital receiver designs rely on the VCT to quickly generate the channel map. However, with the advent of digital receivers with caching capabilities, reliance on the VCT for fast acquisition of program data is no longer necessary, and the PMT can be relied on primarily to generate the channel map. Yet, conventional digital television receivers continue to expend processing power and cost to process information contained in the VCT.

Embodiments of the present invention, as will be further described below, significantly decrease the processing requirements as well as the cost of digital television receivers. In an embodiment, processing requirements of both hardware and software components in digital television receivers are lowered by generating the channel map without regard to channel map information present in the VCT. For example, by discarding PID information that is replicated in the VCT, conflicts between PAT/PMT information and VCT information can be avoided when a broadcaster makes a VCT based mistake. In another embodiment, significant recurring portions of the ATSC signal can be neglected with no processing power, cost, and time spent thereon. In another embodiment, processing typically used to process channel map information contained in the VCT portion of the ATSC signal is instead used to process other channel specific information, thereby enabling further enhancements and features in digital television services.

FIG. 1 illustrates an example of a typical bit stream syntax 100 used to transmit an ATSC table section. Bit stream syntax 100 may be used to convey any ATSC table section, including, for example, a PMT section or a VCT section. As used herein, a section refers to a data structure comprising a portion of a defined table.

As shown in FIG. 1, bit stream syntax 100 begins with a table_id field 102, which identifies the table type (e.g., VCT, PMT, etc.) of the table section carried by the syntax. After table_id field 102, a Section_length field 104 indicates the number of remaining bytes in the table section immediately following Section_length field 104 up to the end of the section. Subsequently, a Num_channels_in_section field 106 indicates the number of virtual channels contained in the table section. In the example of FIG. 2, the table section includes two virtual channels, CHANNEL 1 and CHANNEL 2.

Then, for each virtual channel in the table section, the table section syntax includes a respective loop of channel descriptors. A channel descriptors loop includes one or more channel descriptors and begins with a Descriptors_length field 108. The Descriptors_length field 108 indicates the number of bytes of channel descriptors in the channel descriptors loop immediately following the Descriptors_length field 108. Within the channel descriptors loop, channel descriptors are listed sequentially, with each beginning with a Descriptor_tag field 110 followed by a Descriptor_length field 112. The Descriptor_tag field 110 identifies the descriptor type of the descriptor. The Descriptor_length field 112 indicates the number of bytes of descriptor data immediately following the Descriptor_length 112 field.

Following the channel descriptors loops of virtual channels contained in the table section, additional descriptors may be available within the table section. The length of additional descriptors present in the table section is indicated by an Additional_descriptors_length field 116, which specifies the number of bytes of additional descriptors immediately following the Additional_descriptors_length field 116. Finally, the table section syntax ends with a CRC_32 field 118, which is a 32-bit cyclic redundancy check value used to verify the correctness of the data.

In the case of a VCT, the channel descriptors loop associated with a virtual channel includes a Service Location Descriptor (SLD). For example, FIG. 1 shows the SLD of virtual CHANNEL 2. As shown in FIG. 1, the syntax of a SLD descriptor is identical to that of other channel descriptors of a virtual channel, and begins with a Descriptor_tag field 120 followed by a Descriptor_length field 122. The Descriptor_tag field 120 identifies the descriptor as a SLD descriptor. The Descriptor_length field 122 indicates the number of bytes of SLD data 124 immediately following the Descriptor_length field.

A SLD in a VCT contains channel map information that replicates channel map information present in the PMT. For example, the SLD of a given virtual channel includes information that associates the virtual channel with PIDs, which are identical to PIDs contained in the PMT.

As mentioned above, although the VCT is broadcast more frequently than the PMT, reliance on the VCT channel map information for fast acquisition of broadcast channels is no longer necessary with the introduction of caching in digital television receivers. As such, processing of SLD descriptors in VCT sections has become wasteful of resources available at the digital television receiver. Embodiments of the present invention, as will be further described below, enable systems and methods of processing an ATSC signal to generate a channel map without regard to channel map information contained in VCT sections transmitted within the ATSC signal.

FIG. 2 is a process flowchart 200 of a method of processing a packetized stream containing program content and information according to an embodiment of the present invention. In an embodiment, the packetized stream is encoded according to the MPEG-2 ("Moving Pictures Expert Group-2") standard. In another embodiment, the program content and information contained in the packetized stream correspond to multiple broadcast television channels.

Process 200 begins in step 202, which includes receiving a transport packet of the packetized stream in a first-in-first-out (FIFO) memory. In an embodiment, the FIFO memory is part of a digital television receiver chip.

In step 204, process 200 includes reading contents of the transport packet from the FIFO memory. Subsequently, step 206 includes checking whether an end-of-file (EOF) indicator has been reached, i.e., the FIFO memory is empty. If an EOF indicator is reached, process 200 terminates with step 208. Otherwise, process 200 proceeds to step 210.

In step 210, process 200 includes detecting a start of a Virtual Channel Table (VCT) in the read contents of the transport packet, where the VCT includes channel information associated with one or more virtual channels. In an embodiment, detecting a start of a VCT includes detecting a "table id" field having a value representative of a VCT.

If no VCT is detected in step 210, process 200 proceeds to step 212, which includes writing the read contents of the transport packet to a buffer.

Otherwise, if a start of a VCT is detected in step 210, then process 200 includes, for each virtual channel represented in the VCT, discarding from the FIFO without reading bits representative of channel descriptors of the virtual channel, and writing replacement bits having equal bit length as the discarded bits to the buffer. In an embodiment, the discarded bits include bits representative of a Service Location Descriptor (SLD) of the virtual channel.

In particular, process 200 includes in step 214 reading a "number of channels" field of the VCT, which indicates the number of virtual channels contained in the VCT. Then, in steps 216-224, process 200 implements a loop that repeats for the number of channels contained in the VCT. In an embodiment, the loop includes steps 218, 220, and 222. Step 218 includes reading a "descriptors length" field having a value which represents the number of bits of channel descriptors immediately following the "descriptors length" field. Then, to omit without reading the channel descriptors of the virtual channel, step 220 includes incrementing a read pointer of the FIFO memory by an equal number of bits as the value of the "descriptors length" field. Finally, step 222 includes writing replacement bits to the buffer having a bit length equal to the value of the "descriptors length" field. In an embodiment, the replacement bits include zero bits. Alternatively, the replacement bits include dummy stuffing bits which correspond to dummy channel descriptors. In an embodiment, the "descriptors length" field is a 10-bit field (i.e., maximum value of 1023) and the "descriptor length" field is an 8-bit field (i.e., maximum value of 255), and therefore the replacement bits include up to four dummy channel descriptors.

In an embodiment, at the end of process 200, the contents of the buffer include bits equivalent to the received transport packet with any bits representative of channel descriptors of a VCT initially in the received transport packet replaced with replacement bits. In another embodiment, the contents of the buffer include bits equivalent to ATSC (Advanced Television Systems Committee) table sections with any bits representative of channel descriptors of a VCT initially received in the packetized stream replaced with replacement bits. The contents of the buffer can be used to generate a channel map useable in displaying the multiple broadcast channels.

According to embodiments of the present invention, process 200 can be implemented using a combination of hardware and software components of a digital television receiver.

FIG. 3 is a process flowchart 300 of another method of processing a packetized stream containing program content and information according to an embodiment of the present invention. Process 300 shares common steps with process 200 described in FIG. 2, including steps 202-218 and 224. For the ease of presentation, some of these steps are not shown in FIG. 3 and will not be described below.

As shown in FIG. 3, process 300 includes within the loop described above with respect to process 200 (i.e., steps 216, 218, and 224) a nested loop implemented by steps 304-314. As such, process 300 includes for each virtual channel represented in the VCT, for each channel descriptor of the virtual channel in the VCT, discarding from the FIFO without reading bits representative of the channel descriptor, and writing replacement bits having equal bit length as the discarded bits to the buffer.

In particular, process 300 includes in step 302, following step 218, setting a remaining descriptors length equal to the value of the "descriptors length" field read in step 218. The remaining descriptors length indicates the bit length of channel descriptors remaining for the particular virtual channel being processed from the VCT. Then, while the remaining descriptors length has not reached zero, process 300 implements a loop in steps 306-314. In particular, in step 306, process 300 includes reading a "descriptor tag" field of the channel descriptor, which indicates the type of the channel descriptor. Next, in step 308, process 300 includes reading a "descriptor length" field, which indicates the bit length of descriptor data immediately following the "descriptor length" field. Then, to omit without reading the channel descriptor data, step 310 includes incrementing a read pointer of the FIFO memory by an equal number of bits as the value of the "descriptor length" field read in step 306. Subsequently, step 312 includes writing replacement bits to the buffer having a bit length equal to the value of the "descriptor length" field read in step 306. Finally, the remaining descriptors length is decreased by the amount of data read in steps 306 and 308 and the bit length of descriptor data omitted in step 310.

FIG. 4 illustrates an example implementation of a digital television receiver chip 400 capable of performing embodiments of the present invention. As will be understood by a person skilled in the art, embodiments of the present invention are not limited to the example implementation shown in FIG. 4.

As shown in FIG. 4, receiver chip 400 receives an intermediate frequency (IF) signal. Typically, the received IF signal results from down-converting a radio frequency (RF) cable signal 402 via an IF tuner 404.

The IF signal is input into a demodulator, which generates a demodulated signal. In an embodiment, receiver chip 400 supports different demodulation schemes which correspond to different modulation standards. For example, in FIG. 4, receiver chip 400 supports OFDM demodulation via demodulator 406 and QAM demodulation via demodulator 408. As such, the IF signal may be input into one of multiple available demodulators depending on the modulation standard used.

The demodulated signal is directed through a switch 410 to TPS module 416. It is noted that in the case of an encrypted signal (e.g., DVB-CI) switch 410 routes the demodulated signal outside of receiver chip 400 (via signal 412) for decryption. The decrypted signal is then routed back into TPS module 416 of receiver chip 400 via signal 414.

TPS module 416 serves to process and filter the demodulated signal and to transfer the filtered signal to an external storage memory 436 (e.g., DRAM). As shown in FIG. 4, TPS module 416 includes among other components a switch 418, a set of TPS registers 420, a first FIFO memory 422, a PID filter 424, a micro code engine 426, a section filter 428, and a second FIFO memory 430.

Switch 418 selects the active signal among the one or more input signals of TPS module 416 for processing by TPS module 416. The selected signal is then input via a framer into FIFO memory 422. It is noted that the demodulated input signal includes a plurality of transport packets, which are sequentially input into FIFO 422.

TPS registers 420 serve to load configuration data for different components of TPS module 416. For example, in an embodiment, a software module external to receiver chip 400 may use TPS registers 420 to load Code RAM 440 with proprietary code for execution by micro-code engine 426. Similarly, the software module may use TPS registers 420 to configure PID filter 424 and section filter 428. In particular, the software module configures PID filter 422 and section filter 428 to search for specific PID (Packet ID) and TID (Table ID) values, respectively, in transport packets as the transport packets are read out of FIFO 422.

Micro-code engine 426 controls reading out of FIFO 422 and writing to FIFO 430. In particular, when a transport packet is received into FIFO 422, the transport packet sits in FIFO 422 until it is processed in whole by micro-code engine 426. This first includes triggering PID filter 424 to filter the transport packet for the specific PID value loaded into PID filter 424 and to report whether a match has been found (i.e., whether a PID value in the transport packet matches the specific PID value loaded into PID filter 424). If a PID match is found, micro-code engine 426 controls a read pointer of FIFO 422 to skip bytes in the transport packet until the read pointer reaches a TID byte position in the packet. Then, micro-code engine 426 triggers section filter 428 to compare the value of the TID byte in the transport packet with the specific TID value loaded into section filter 428 and to report whether a match has been found. If a TID match is found, micro-code engine 426 determines whether the matching TID represents a VCT TID.

If the matching TID represents a VCT TID, micro-code engine 426 controls the read pointer of FIFO 422 and the write pointer of FIFO 430 to transfer VCT section header bytes into FIFO 430 until the read pointer of FIFO 422 reaches the "section_length" field position in the VCT (the actual transfer of data is actually performed by hardware within TPS module 416). Then, after reading the "section_length" field value, micro-code engine 426 loads the value into a first internal hardware counter and simultaneously triggers the read pointer of FIFO 422 and the write pointer of FIFO 430 to transfer into FIFO 430 bytes corresponding to the "section_length" field and any following VCT section header bytes until the read pointer of FIFO 422 reaches the "num_of_channels_in_section" field position in the VCT. As bytes corresponding to the bytes specified by micro-code engine 426 are transferred, the value of the first internal hardware counter is decreased accordingly to reflect remaining section bytes.

Subsequently, micro-code engine 426 controls the read pointer of FIFO 422 and the write pointer of FIFO 430 to transfer any following VCT section header bytes until the read pointer of FIFO 422 reaches the "descriptors_length"

field position in the VCT. As hardware within TPS module 416 performs the byte transfer as specified by micro-code engine 426, the value of the first internal hardware counter is decreased accordingly to reflect remaining section bytes.

Micro-code engine 426 checks that the value of the "descriptors_length" field is not zero. Micro-code engine 426 then loads the value of the "descriptors_length" field into a second internal hardware counter and simultaneously triggers the read pointer of FIFO 422 and the write pointer of FIFO 430 to transfer into FIFO 430 bytes corresponding to the "descriptors_length" field until the read pointer of FIFO 422 reaches the first "short_name" field position in the VCT. As hardware within TPS module 422 performs the byte transfer as specified by micro-code engine 426, the values of both the first internal hardware counter and the second internal hardware counter are decreased accordingly to reflect remaining section bytes and remaining descriptors bytes, respectively. Micro-code engine 422 then controls the read pointer of FIFO 422 and the write pointer of FIFO 430 to transfer into FIFO 430 any following VCT section bytes until the read pointer of FIFO 422 reaches the first "descriptor_tag" field in the VCT. As before, the values of both the first internal hardware counter and the second internal hardware counter are decreased according to the transferred bytes to reflect remaining section bytes and remaining descriptors bytes, respectively.

In an embodiment, when the first "descriptor_tag" field is reached, micro-code 426 sends a stuffing tag to FIFO 430 by controlling the write pointer of FIFO 430. Micro-code engine 426 also controls the read pointer of FIFO 422 to discard the "descriptor_tag" field thereby reaching the first "descriptor_length" field. Hardware within TPS module 416 discards the "descriptor_tag" field byte without actual transfer to FIFO 430. However, the values of the first and second internal hardware counters are decreased as if the byte had been transferred.

Subsequently, micro-code engine 426 loads the value of the "descriptor_length" field into a third internal hardware counter and then triggers the read pointer of FIFO 422 and the write pointer of FIFO 430 to transfer bytes corresponding to the "descriptor_length" field into FIFO 430 until the read pointer of FIFO 422 reaches the position of the first descriptor payload byte. As before, hardware within TPS module 422 performs the byte transfer as specified by micro-code engine 426, and the values of both the first internal hardware counter and the second internal hardware counter are decreased accordingly to reflect remaining section bytes and remaining descriptors bytes, respectively.

Micro-code engine 426 then sends stuffing (i.e., garbage) bytes having equal length as the value of the "descriptor_length" field to FIFO 430 by controlling the write pointer of FIFO 430. Micro-code engine 426 also controls the read pointer of FIFO 422 to discard descriptor payload bytes having equal length as the value of the "descriptor_length" field, thereby reaching the second "descriptor_tag" field in the VCT, if any. Hardware within TPS module 416 discards the payload bytes as specified by micro-code engine 422 without actual transfer to FIFO 430. However, the values of the first, second, and third hardware counters are each decreased by the number of discarded bytes to reflect remaining section bytes, descriptors bytes, descriptor payload bytes.

As would be understood by a person skilled in the art, micro-code engine 422 operates as described above to process all channel descriptors of a given virtual channel, before processing channel descriptors of any subsequent virtual channels contained in the VCT. When all channels contained in the VCT have been processed as described above, micro-code engine 426 controls the read pointer of FIFO 422 and the write pointer of FIFO 430 to transfer any following VCT section bytes into FIFO 430 until the read pointer of FIFO 422 reaches an "End of Section" indicator or a next TID byte position. Hardware within TPS module 416 transfers directly from FIFO 422 into FIFO 430 bytes as specified by micro-code engine 426. The value of the first hardware counter is decreased as bytes are transferred to reflect remaining section bytes.

It is noted that as bytes are transferred into FIFO 430, the transferred bytes are subsequently transferred by other hardware blocks into DRAM memory 436. Software and/or hardware components can then act on the contents of DRAM 436 to assemble sections contained in the transport packets. However, contents of DRAM 436 will not contain any VCT channel descriptors.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of processing a packetized stream containing program content and information corresponding to a broadcast channel associated with one or more virtual channels, comprising:
   (a) receiving a transport packet of the packetized stream in a first-in-first-out (FIFO) memory;
   (b) sequentially reading contents of the transport packet from the FIFO memory;
   (c) detecting a start of a Virtual Channel Table (VCT) in the read contents of the transport packet, wherein the VCT includes channel information associated with the one or more virtual channels;
   (d) if no VCT is detected in step (c), writing the read contents of the transport packet to a buffer;
   (e) if a start of a VCT is detected in step (c), for each virtual channel represented in the VCT, discarding, from the FIFO memory without reading, bits representative of channel descriptors of the virtual channel, and writing replacement bits having equal bit length as the discarded bits to the buffer; and
   (f) generating a channel map useable in displaying the broadcast channels using only contents of the buffer.

2. The method of claim 1, wherein detecting a start of a VCT in the read contents of the transport packet comprises detecting a "table id" field having a value representative of a VCT.

3. The method of claim 1, wherein step (e) further comprises, for each virtual channel represented in the VCT:
(g) reading a "descriptors length" field having a value representative of a number of bits of channel descriptors immediately following the "descriptors length" field; and
(h) writing replacement bits to the buffer having a bit length equal to the value of the "descriptors length" field.

4. The method of claim 3, further comprising:
if a start of a VCT is detected in step (c), after reading the "descriptors length" field in step (g), incrementing a read pointer of the FIFO by an equal number of bits as the value of the "descriptors length" field.

5. The method of claim 1, wherein step (e) further comprises, for each virtual channel represented in the VCT, for each channel descriptor in the VCT:
(g) reading a "descriptor length" field having a value representative of a number of bits of channel descriptor data immediately following the "descriptor length" field; and
(h) writing replacement bits to the buffer having a bit length equal to the value of the "descriptor length" field.

6. The method of claim 5, further comprising:
if a start of a VCT is detected in step (c), after reading the "descriptor length" field in step (g), incrementing a read pointer of the FIFO by an equal number of bits as the value of the "descriptor length" field.

7. The method of claim 1, wherein the replacement bits include zero bits.

8. The method of claim 1, wherein the replacement bits include dummy stuffing bits.

9. The method of claim 8, wherein the replacement bits include up to four dummy channel descriptors.

10. The method of claim 1, wherein the discarded bits include bits representative of a Service Location Descriptor (SLD) of the virtual channel.

11. The method of claim 1, wherein the transport packet is encoded according to the MPEG-2 ("Moving Pictures Expert Group-2") standard.

12. The method of claim 1, wherein the contents of the buffer include bits equivalent to the received transport packet with any bits representative of channel descriptors of a VCT initially in the received transport packet replaced with replacement bits.

13. The method of claim 1, wherein the contents of the buffer include bits equivalent to ATSC (Advanced Television Systems Committee) table sections with any bits representative of channel descriptors of a VCT initially received in the packetized stream replaced with replacement bits.

14. The method of claim 1, wherein steps (a)-(f) are performed using a combination of hardware and software components of a digital television receiver.

15. The method of claim 1, wherein steps (a)-(e) are performed using hardware components and step (f) is performed using software components of a digital television receiver.

16. A receiver useable to process a packetized stream containing program content and information corresponding to a broadcast channel associated with one or more virtual channels, comprising:

a first-in-first-out (FIFO) memory configured to receive a transport packet of the packetized stream; and
a micro-code engine configured to sequentially read contents of the transport packet from the FIFO and to detect a start of a Virtual Channel Table (VCT) in the read contents of the transport packet, wherein the VCT includes channel information associated with the one or more virtual channels;
wherein the micro-code engine is further configured so that, if no VCT is detected in the read contents of the transport packet, to write the read contents of the transport packet to a buffer, and
wherein the micro-code engine is further configured so that, if a start of a VCT is detected, for each virtual channel represented in the VCT, to discard, from the FIFO memory without reading, bits representative of channel descriptors of the virtual channel, and to write replacement bits having equal bit length as the discarded bits to the buffer; and
means for generating a channel map useable in displaying the broadcast channels using only contents of the buffer.

17. The receiver of claim 16, wherein the replacement bits include zero bits.

18. The receiver of claim 16, wherein the replacement bits include dummy stuffing bits.

19. The receiver of claim 18, wherein the replacement bits include up to four dummy channel descriptors.

20. The receiver of claim 16, wherein the discarded bits include bits representative of a Service Location Descriptor (SLD) of the virtual channel.

21. The receiver of claim 16, wherein the transport packet is encoded according to the MPEG-2 ("Moving Pictures Expert Group-2") standard.

22. A method of processing a packetized stream containing program content and information corresponding to a broadcast channel associated with one or more virtual channels, comprising:
(a) receiving a transport packet of the packetized stream in a first-in-first-out (FIFO) memory;
(b) sequentially reading contents of the transport packet from the FIFO memory;
(c) detecting a start of a Virtual Channel Table (VCT) in the read contents of the transport packet, wherein the VCT includes channel information associated with the one or more virtual channels;
(d) if no VCT is detected in step (c), writing the read contents of the transport packet to a buffer;
(e) if a start of a VCT is detected in step (c), for each virtual channel represented in the VCT, discarding, from the FIFO memory without reading, bits representative of channel descriptors of the virtual channel and modifying a "descriptors length" field having a value representative of the length of said bits to have a value of zero; and
(f) generating a channel map useable in displaying the broadcast channels using only contents of the buffer.

23. The method of claim 22, further comprising:
modifying a "section length" field having a value representative of a number of bits in the table section immediately following said "section length" field to account for said modified "descriptors length" field.

* * * * *